Figure 1:
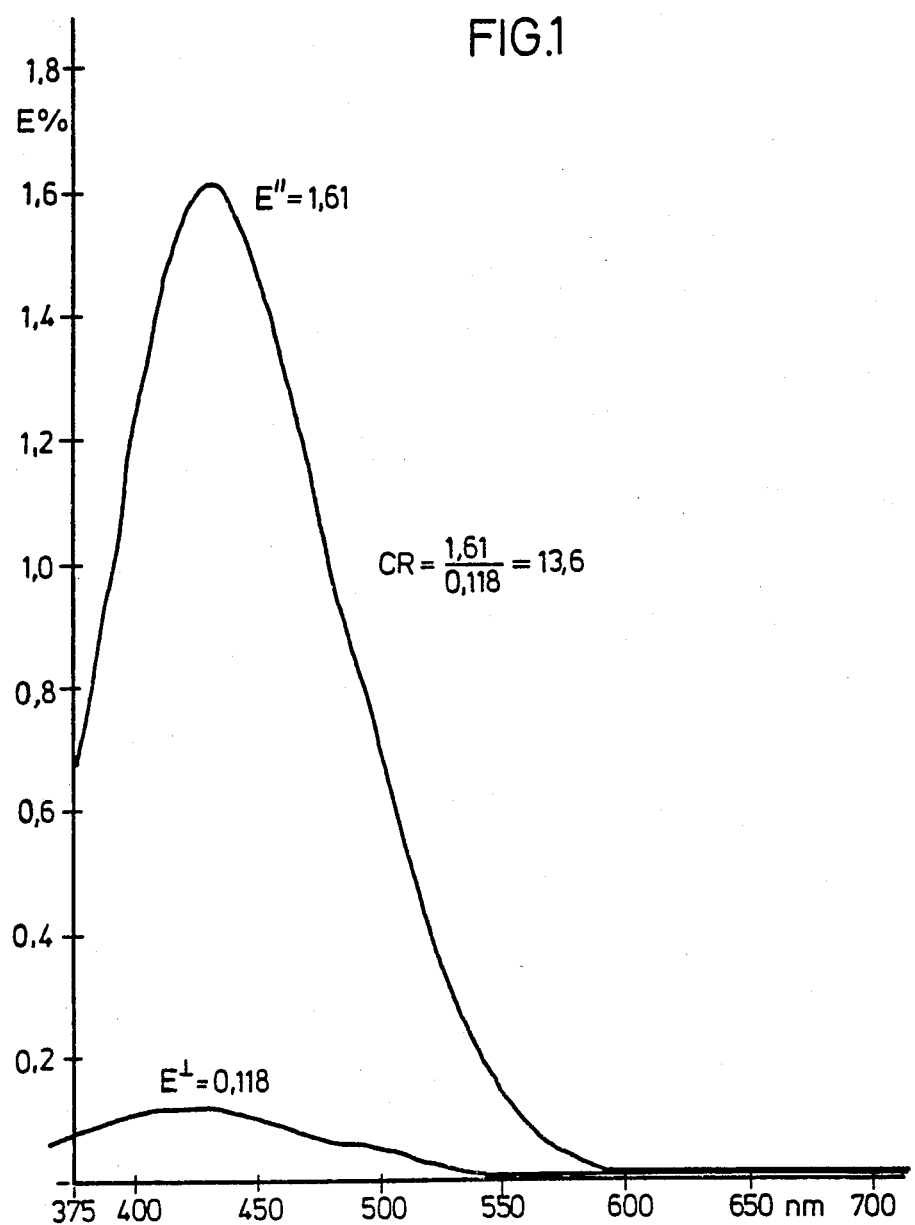

United States Patent [19]

Etzbach et al.

[11] Patent Number: 4,724,259
[45] Date of Patent: Feb. 9, 1988

[54] AZO DYES AND LIQUID-CRYSTALLINE MATERIALS CONTAINING THESE DYES

[75] Inventors: Karl-Heinz Etzbach, Frankenthal; Werner Juenemann, Bad Durkheim; Johannes Dehnert, Ludwigshafen, all of Fed. Rep. of Germany

[73] Assignee: BASF Aktiengesellschaft, Ludwigshafen, Fed. Rep. of Germany

[21] Appl. No.: 673,984

[22] Filed: Nov. 21, 1984

[30] Foreign Application Priority Data

Nov. 22, 1983 [DE] Fed. Rep. of Germany ....... 3342040

[51] Int. Cl.$^4$ .................. C09B 31/16; C09B 33/18; C09B 35/55; G09K 3/34
[52] U.S. Cl. ................... 534/577; 534/561; 534/582; 534/596; 534/649; 534/809; 534/887; 252/299.1; 252/299.68
[58] Field of Search .......... 534/577, 573, 649, 809

[56] References Cited

U.S. PATENT DOCUMENTS

| | | | |
|---|---|---|---|
| 2,941,560 | 3/1976 | Renfrew et al. | 534/809 X |
| 4,145,114 | 3/1979 | Coates et al. | 534/809 X |
| 4,231,746 | 11/1980 | Dehnert et al. | 8/680 |
| 4,308,161 | 12/1981 | Aftergut et al. | 252/299.1 |
| 4,308,162 | 12/1981 | Cole et al. | 534/573 X |
| 4,308,163 | 12/1981 | Aftergut et al. | 534/573 X |
| 4,308,164 | 12/1981 | Aftergut et al. | 534/573 X |

FOREIGN PATENT DOCUMENTS

3245751 6/1984 Fed. Rep. of Germany ...... 534/577

Primary Examiner—Floyd D. Higel
Attorney, Agent, or Firm—Oblon, Fisher, Spivak, McClelland & Maier

[57] ABSTRACT

Compounds of the general formula I

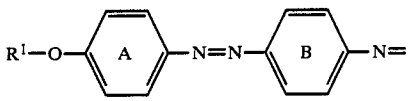
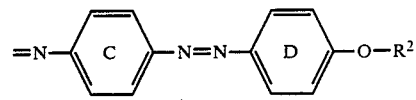

where $R^1$ and $R^2$ independently of one another are each $C_6$–$C_{24}$-alkyl or are each benzyl which is unsubstituted or substituted by alkyl or by cycloalkyl, and one of the radicals may furthermore be hydrogen, and the rings A, B, C and D can be further substituted by chlorine, methyl or methoxy, with the exception of the compound of the formula

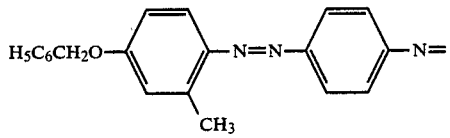
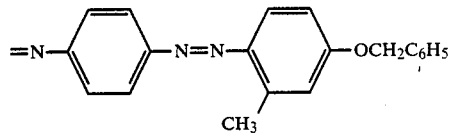

are useful as dyes in electrooptical liquid crystal displays or for the production of polarization films.

13 Claims, 4 Drawing Figures

AZO DYES AND LIQUID-CRYSTALLINE MATERIALS CONTAINING THESE DYES

The present invention relates to compounds of the general formula I

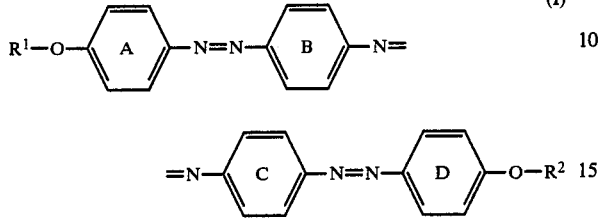

where $R^1$ and $R^2$ independently of one another are each $C_6$–$C_{24}$-alkyl or are each benzyl which is unsubstituted or substituted by alkyl or cycloalkyl, and one of the radicals may furthermore be hydrogen, and the rings A, B, C and D can be further substituted by chlorine, methyl or methoxy, with the exception of the compound of the formula

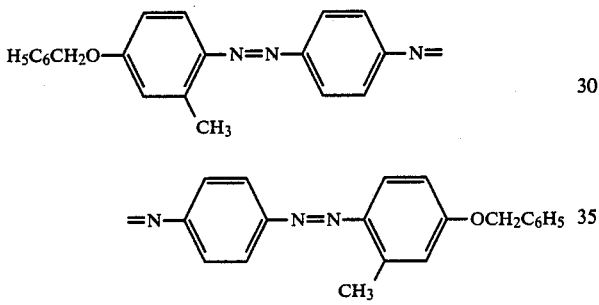

Alkyl radicals $R^1$ and $R^2$ are all conventional n-alkyl and iso-alkyl radicals of 6 to 18, in particular 8 to 12, carbon atoms. Specific examples of radicals are n-hexyl, n-heptyl, n-octyl, isooctyl, n-nonyl, isononyl, n-dodecyl, 1-ethylhexyl, 2-ethylhexyl and n-pentadecyl.

Substituted benzyl radicals can be substituted by, for example, $C_1$–$C_{24}$-alkyl or, in particular, cyclohexyl or $C_1$–$C_7$-alkylcyclohexyl.

The substituted benzyl radicals are, for example, of the formula

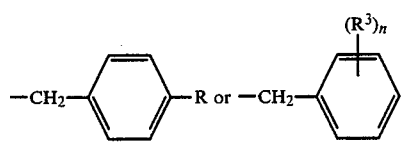

where n is 1, 2 or 3, $R^3$ is $C_1$–$C_4$-alkyl and R is $C_1$–$C_{24}$-alkyl or is cyclohexyl which is unsubstituted or substituted by $C_1$–$C_7$-alkyl.

Specific examples of radicals R are ethyl, n-propyl, isopropyl, n-butyl, tert.-butyl, n-pentyl, n-heptyl, n-dodecyl, 4-ethylcyclohexyl, 4-n-propylcyclohexyl, 4-n-butylcyclohexyl, 4-n-pentylcyclohexyl and 4-n-heptylcyclohexyl.

Compounds of the formula I can be prepared by reacting a tetrazonium compound of a diamine of the formula

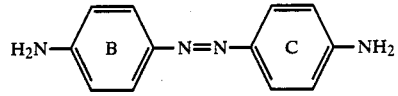

with identical or different coupling components of the formulae

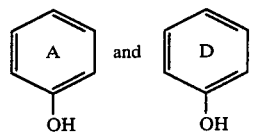

and then introducing the radicals $R^1$ and $R^2$ by a conventional method.

The Examples which follow illustrate the preparation. Parts and percentages are by weight, unless stated otherwise.

Particularly important compounds of the formula I are those in which $R^1$ and $R^2$ are each benzyl which is substituted in the p-position by 4-($C_1$–$C_7$-alkyl)-cyclohexyl or by $C_2$–$C_9$-alkyl. Preferred $C_1$–$C_7$-alkyl radicals are ethyl, n-propyl, n-butyl, n-pentyl, n-hexyl and n-heptyl, and the corresponding isoalkyl radicals can also be used.

Other preferred radicals $R^1$ and $R^2$ are the isomeric $C_7$–$C_{10}$-radicals. Furthermore, in order to increase the solubility, mixtures of compounds of the formula I, in which $R^1$ and $R^2$ can be both alkyl and substituted benzyl, are preferably used.

The compounds of the formula I are particularly useful as pleochroic dyes in electrooptical liquid crystal displays of the guest-host type, and for the production of colored polarization films.

Liquid-crystalline materials which contain pleochroic dyes are used in displays. The principles of the novel use are known and are described in, for example, H. Kelker and R. Hatz, Handbook of Liquid Crystals (1980), page 611 et seq., R. J. Cox, Mol. Cryst. Liq. Cryst. 55 (1979), 51 et seq., and L. Pauls and G. Schwarz, Elektronik 14 (1982), 66 et seq. Further literature giving a detailed description of the use according to the invention is cited in the stated publications.

Dyes for liquid-crystalline mixtures must meet a number of requirements (cf. for example J. Constant et al., J. Phys. D: Appl. Phys. 11 (1978), 479 et seq., F. Jones and T. J. Reeve, Mol. Cryst. Liq. Cryst. 60 (1980), 99 et seq. and European Pat. Nos. 43,904, 55,838 and 65,869). They must not ionize in an electric field, must possess a very high molar extinction coefficient ε and high solubility in the liquid crystal matrix used, must be chemically and, in particular, photochemically stable, and, as far as possible, must possess a degree of order S greater than 0.75 in the particular nematic phase in order for the guest-host display to exhibit good contrast.

Most of the dyes which meet these requirements belong to the class comprising the anthraquinones (cf. for example European Pat. No. 56,492, 44,893, 59,036 and 54,217).

To date, azo dyes have the disadvantage, in particular, that either the solubility or the light-stability is unsatisfactory.

Surprisingly, the novel dyes possess a high degree of order coupled with high solubility and good light-stability in the particular liquid crystal matrix.

The use of dichroic dyes for the production of polarization films is described by, for example, R. Mizoguchi et al. in Displays, 4 (1983), 201 et seq., where further literature is also cited.

GENERAL METHODS OF PREPARATION

Example 1

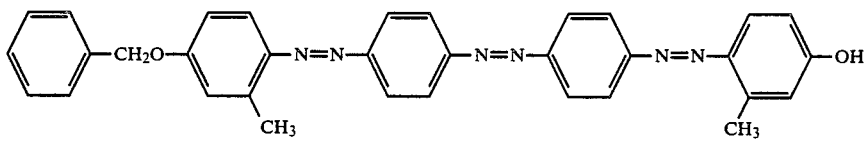

A mixture of 21.2 parts of 4,4'-diaminoazobenzene, 660 parts of water and 80 parts of concentrated hydrochloric acid was filtered, 600 parts of ice were added to the filtrate, and then 60 parts of a 23% strength aqueous sodium nitrite solution were added slowly at 5° C. When the addition was complete, the mixture was stirred for a further 4 hours at 5° C. and then added dropwise to a solution of 21.6 parts of m-cresol in 500 parts of water and 8 parts of sodium hydroxide solution, while cooling with ice. During this procedure, the pH was kept at 7 by simultaneously adding 10% strength aqueous sodium hydroxide solution. The mixture was then stirred overnight, and the precipitate formed was filtered off under suction, washed with water and dried. 41 parts of 4,4'-di-(2-methyl-4-hydroxyphenylazo)-azobenzene were obtained.

A mixture of 6.8 parts of this product, 2.1 parts of potassium carbonate, 2.6 parts of benzyl bromide and 50 parts of dimethylformamide was stirred for 3 hours at 80° C., 100 parts of water were added at room temperature, and the precipitate was filtered off under suction, washed with water and dried to give 6.9 parts of a dye mixture consisting of the starting compound, 4-(2-methyl-4-hydroxyphenylazo)-4'-(2-methyl-4-benzyloxyphenylazo)-azobenzene (1) and 4,4'-di-(2-methyl-4-benzyloxyphenylazo)azobenzene.

The desired dye I was obtained in pure form by chromatographing the dye mixture over silica gel (MN silica gel 60, 0.063–0.2 mm) using a 10:1 toluene/ethyl acetate mixture as the mobile phase, and then recrystallizing the product from toluene. Mp.: 191° C., $\lambda_{max}$ (CH$_2$Cl$_2$): 415 nm.

Example 2

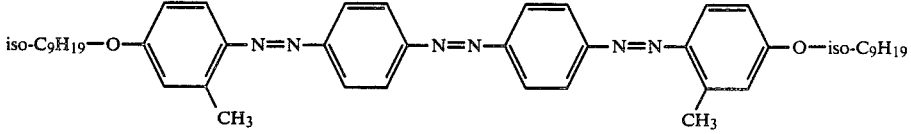

A mixture of 13.5 parts of 4,4'-di-(2-methyl-4-hydroxyphenylazo)-azobenzene, 8.3 parts of potassium carbonate, 10.8 parts of isononyl chloride and 150 parts of dimethylformamide was stirred for 5 hours at 100° C., 300 parts of water were added at room temperature, and the precipitate was filtered off under suction, washed with water and dried to give 17 parts of crude product. The dialkylated product was purified as described in Example 1. Mp.: 146° C., $\lambda_{max}$ (CH$_2$Cl$_2$): 417 nm.

Other dyes prepared in a similar manner are described in the Table below:

| Example | | m.p. | $\lambda_{max}$ (CH$_2$Cl$_2$) |
|---|---|---|---|
| 3 | $R^1 = R^2 = -CH_2-$ (2,4,6-trimethylphenyl) | 220° C. | 416 nm |
| 4 | $R^1 = R^2 = -CH_2-$ (4-tert-butylphenyl) | 244° C. | 416 nm |
| 5 | $R^1 = H, R^2 = -CH_2-$ (4-pentylcyclohexylphenyl) | 177° C. | 417 nm |
| 6 | $R^1 = R^2 = -CH_2-$ (4-ethylcyclohexylphenyl) | 263° C. | 417 nm |

-continued
| Example | | m.p. | λmax (CH₂Cl₂) |
|---|---|---|---|
| 7 | $R^1 = R^2 = -CH_2-$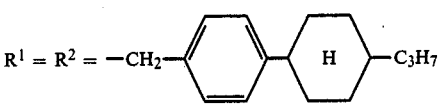$-C_3H_7$ | 240° C. | 415 nm |
| 8 | $R^1 = R^2 = -CH_2-$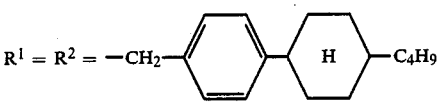$-C_4H_9$ | 198° C. | 415 nm |
| 9 | $R^1 = R^2 = -CH_2-$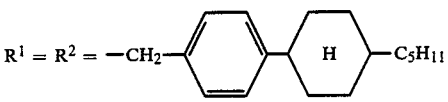$-C_5H_{11}$ | 185° C. | 417 nm |
| 10 | $R^1 = R^2 = -CH_2-$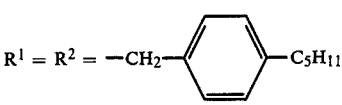$-C_5H_{11}$ | 158° C. | 417 nm |
| 11 | $R^1 = R^2 = -CH_2-$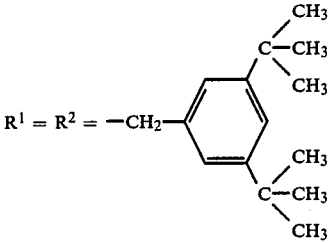 | 209° C. | 416 nm |
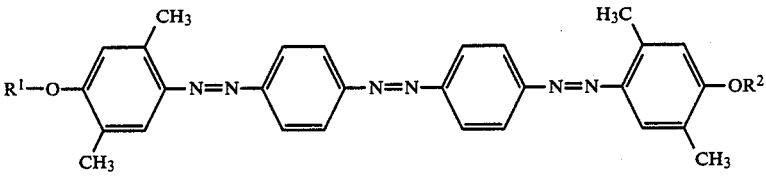
| 12 | $R^1 = R^2 = -CH_2-$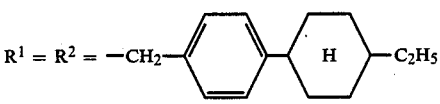$-C_2H_5$ | 265° C. | 428 nm |
| 13 | $R^1 = R^2 = $ iso-$C_9H_{19}$ | 158° C. | 426 nm |
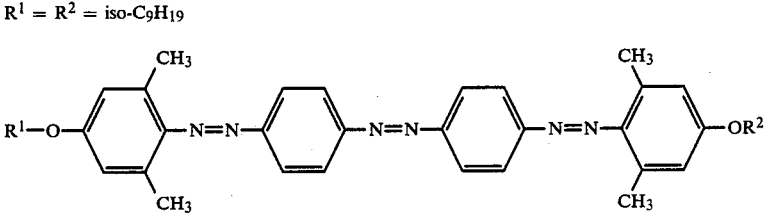
| 14 | $R^1 = R^2 = -CH_2-$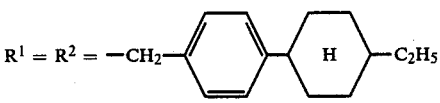$-C_2H_5$ | 225° C. | 411 nm |
| 15 | $R^1 = R^2 = $ iso-$C_9H_{19}$ | 139° C. | 410 nm |
| 16 | $R^1 = R^2 = -CH_2-$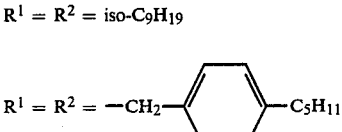$-C_5H_{11}$ | 158° C. | 407 nm |

| Example | | m.p. | λmax (CH₂Cl₂) |
|---|---|---|---|
| 17 | 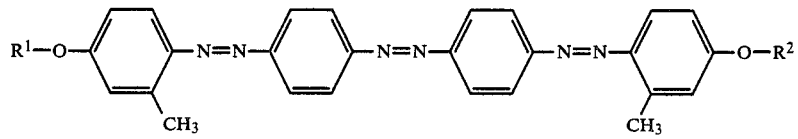 $R^1 = R^2 = $ | 230° C. | 408 nm |

Example 18

where $R^1$ and $R^2$ can be identical or different and are each iso-$C_9H_{19}$ or

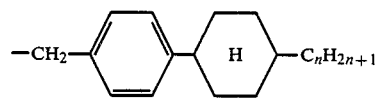 iso-$C_9H_{19}$/—$CH_2$— ... —$C_5H_{11}$

A mixture of 4.5 parts of 4,4'-di-(2-methyl-4-hydroxyphenylazo)-azobenzene, 2.8 parts of potassium carbonate, 2.3 parts of 4-(4'-ethylcyclohexyl)-benzyl chloride and 20 parts of dimethylformamide was stirred for 1 hour at 100° C., 1.8 parts of isononyl chloride were added and stirring was then continued for a further 5 hours at 100° C. The mixture of bisalkylation products formed was filtered off under suction when cold, washed with 20 parts of dimethylformamide and then with water, and dried to give 5.9 parts of crude dye, which was purified by recrystallization from toluene. Mp.: 160°–205° C., λ$_{max}$ (CH₂Cl₂): 416 nm.

Example 19

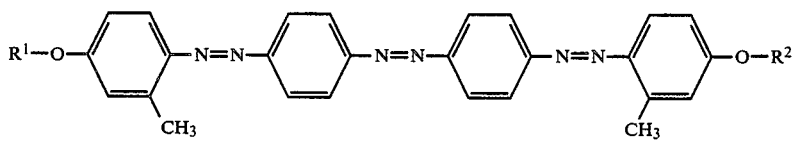

where $R^1$ and $R^2$ can be identical or different and are each

—$CH_2$— ... —$C_nH_{2n+1}$ which n is 2, 3, 4 or 5.

A mixture of 4.5 parts of 4,4'-di-(2-methyl-4-hydroxyphenylazo)-azobenzene, 2.8 parts of potassium carbonate, 1.18 parts of 4-(4'-ethylcyclohexyl)-benzyl chloride, 1.25 parts of 4-(4'-propylcyclohexyl)-benzyl chloride, 1.32 parts of 4-(4'-n-butylcyclohexyl)-benzyl chloride, 1.39 parts of 4-(4'-n-pentylcyclohexyl)-benzyl chloride and 20 parts of dimethylformamide was stirred for 3 hours at 100° C., and the mixture of bisalkylation products formed was filtered off under suction when cold, washed with 20 parts of dimethylformamide and then with water and dried to give 5.9 parts of crude dye, which was purified by recrystallization from toluene.

Mp.: 143°–162° C., λ$_{max}$ (CH₂Cl₂): 416 nm.

The degree of order S measured at room temperature in the broad-range mixture ZLI 1840 from Merck for Examples 1 to 5, 8, 9, 13, 15, 18 and 19, and the solubility likewise determined in ZLI 1840 at room temperature, are summarized in Table 1.

Table 2 contains the solubility L and the degrees of order S measured at room temperature in the broad-range mixture ZLI 1957/5 from Merck for Examples 10, 11, 16 and 17.

The degree of order S was determined using the conventional equation $$CR = \frac{CR - 1}{CR + 2}$$

the measurement being carried out in commercial measuring cells with a homogeneous edge orientation (ground PVA). The dichroic ratio CR was determined by measuring the extinctions E" (measurement with light polarized parallel to the preferred direction of the nematic phase) and E⊥ (measurement with light polarized perpendicular to the preferred direction of the nematic phase) and using the relationship $$CR = E''/E^\perp$$

the dye concentration being chosen so that E" was from 1 to 2. The measurements were carried out in a Beckmann Acta CIII spectrophotometer.

FIG. 1 shows the extinctions E" and E⊥ for Example 19 in ZLI 1840.

The solubility was determined as follows:

50 mg of the particular dye were stirred in 1 ml of ZLI 1840 for 1 week at room temperature, the saturated solution was separated off from the residue by centrifuging, and the solubility was determined by comparison of the extinction.

TABLE 1

| Example | Degree of order S | Solubility L |
| --- | --- | --- |
| 1 | 0.75 | 0.9% |
| 2 | 0.76 | 2.7% |
| 3 | 0.77 | 1.0% |
| 4 | 0.75 | 0.3% |
| 5 | 0.79 | 1.9% |
| 8 | 0.79 | 0.3% |
| 9 | 0.81 | 0.8% |
| 13 | 0.76 | 5% |
| 15 | 0.76 | 5% |
| 18 | 0.80 | 3.3% |
| 19 | 0.81 | 1.5% |

TABLE 2

| Example | Degree of Order S | Solubility L |
| --- | --- | --- |
| 10 | 0.81 | 1.2% |
| 11 | 0.76 | 0.7% |
| 16 | 0.80 | 3% |
| 17 | 0.81 | 0.2% |

Figure 2:
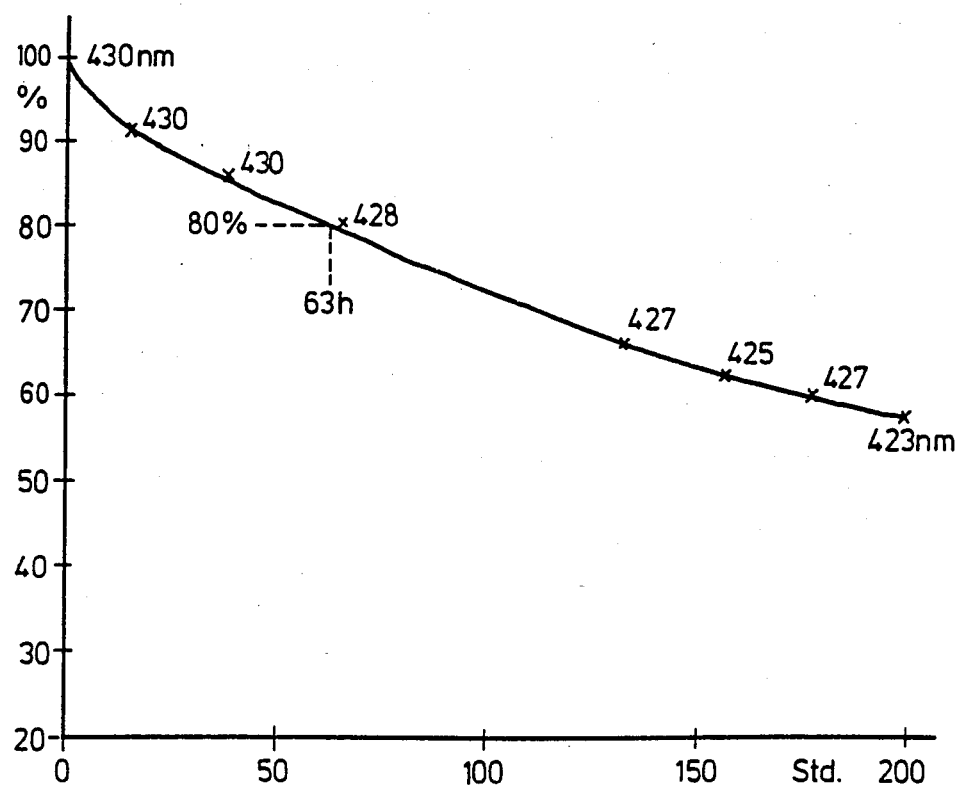
Figure 3:
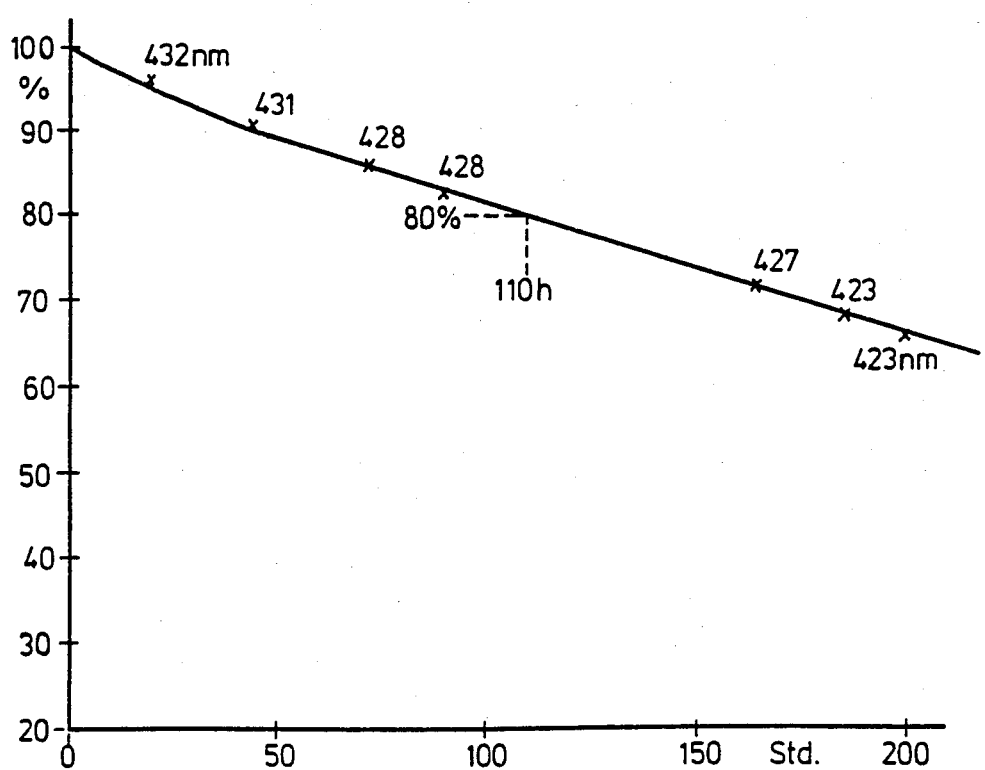
Figure 4:
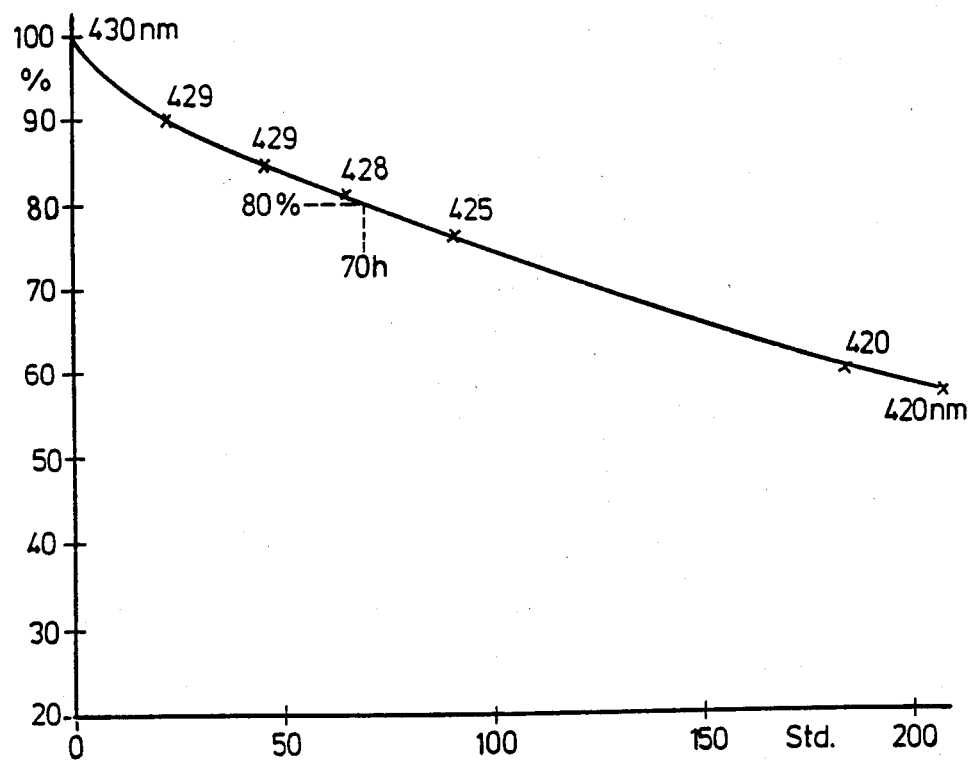

The light stability was determined by high-speed exposure of the measuring cell in a Suntest from Hanau, at 25° C. In this procedure, the decrease in E″ was measured. The initial extinction E″$_o$ and the exposure time E″$_{80\%}$ after which E″$_o$ has decreased to 80% are shown in Table 3 for Examples 2, 3, 5, 9, 18 and 19. The percentage change in E″$_o$ is plotted against the exposure time in FIGS. 2, 3 and 4 for Examples 2, 3 and 5. E″ was determined at the stated $\lambda_{max}$ values.

TABLE 3

| Example | E$_o$″ | E$_{80\%}$″ |
| --- | --- | --- |
| 2 | 1.24 | 63 h |
| 3 | 1.95 | 110 h |
| 5 | 1.23 | 70 h |
| 9 | 1.51 | 140 h |
| 18 | 1.69 | 78 h |
| 19 | 1.61 | 92 h |

We claim:

1. A trisazo dye of the formula:

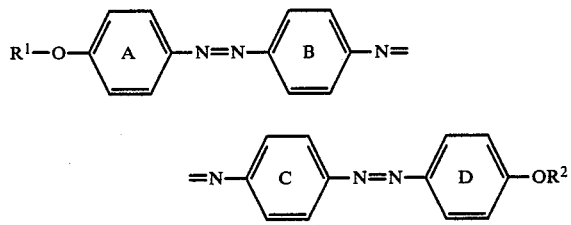

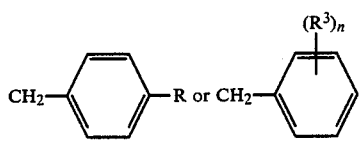

wherein R$^1$ and R$^2$ are different and are each independently hydrogen, C$_6$-C$_{24}$-alkyl or a benzyl radical having one of the formulae:

wherein R is C$_5$-C$_{24}$-alkyl or cycloalkyl, n is 3, R$^3$ is C$_1$-C$_4$-alkyl, and wherein at least one of R$^1$ or R$^2$ is the said benzyl radical; and wherein the rings A, B, C and D, are either unsubstituted or each independently substituted by chlorine, methyl, or methoxy.

2. A trisazo dye of the formula:

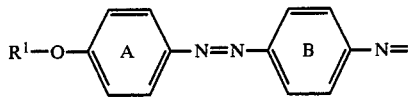

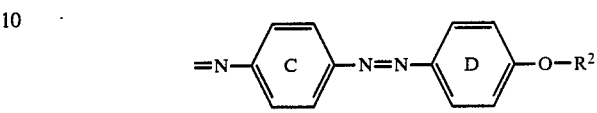

wherein R$_1$ and R$^2$ are each independently hydrogen, C$_6$-C$_{24}$-alkyl, or a benzyl radical of one of the formulae:

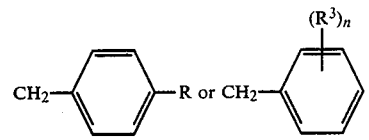

wherein R is C$_5$-C$_{24}$-alkyl or cycloalkyl, n is 3, R$^3$ is C$_1$-C$_4$-alkyl, and wherein at least one of R$^1$ or R$^2$ is the said benzyl radical, and wherein one of the rings A, B, C or D is substituted by at least one substituent selected from the group consisting of chlorine, methyl or methoxy.

3. The compound of claim 1, wherein one of R$^1$ or R$^2$ is independently benzyl substituted by C$_5$-C$_{24}$-alkyl or C$_1$-C$_7$-alkylcyclohexyl, or wherein one of R$^1$ or R$^2$ is an isomeric C$_7$H$_{15}$ to C$_{10}$H$_{21}$ radical.

4. The compound of claim 3, wherein the benzyl and cyclohexyl radicals are each substituted in the p-position.

5. The compound of claim 3, wherein the said benzyl radicals are each substituted by C$_2$-C$_7$-alkylcyclohexyl or by C$_5$-C$_9$-alkyl.

6. The compound of claim 2, wherein ring A and ring D are substituted by at least one methyl substituent.

7. The compound of claim 2, wherein R$^1$ and R$^2$ are independently benzyl substituted by C$_5$-C$_{24}$-alkyl or by C$_1$-C$_7$-alkylcyclohexyl, or wherein one of R$^1$ or R$^2$ is independently one of the isomeric C$_7$H$_{15}$ to C$_{10}$H$_{21}$ radical.

8. The compound of claim 7, wherein the said benzyl and cyclohexyl radicals are each substituted in the p-position.

9. The compound of claim 7, wherein the benzyl radicals are each substituted by C$_2$-C$_7$-alkylcyclohexyl or by C$_5$-C$_9$-alkyl.

10. The compound of claim 1, wherein said C$_6$-C$_{24}$-alkyl substituent is a member selected from the group consisting of n-hexyl, n-heptyl, n-octyl, isooctyl, n-nonyl, isononyl, n-dodecyl, 1-ethylhexyl, 2-ethylhexyl and n-pentadecyl.

11. The compound of claim 1, wherein said benzyl radical is substituted by a C$_5$-C$_{24}$-alkyl group, cyclohexyl or C$_1$-C$_7$-alkylcyclohexyl.

12. The compound of claim 1, wherein the said cycloalkyl substituent is substituted by C$_1$-C$_7$-alkyl.

13. The compound of claim 2, wherein the said cycloalkyl substitutent is substituted by C$_1$-C$_7$-alkyl.

* * * * *